United States Patent [19]
Kato

[11] Patent Number: 5,011,223
[45] Date of Patent: Apr. 30, 1991

[54] LUMBAR SUPPORT DEVICE FOR VEHICLE SEAT

[75] Inventor: Sakae Kato, Akishima, Japan

[73] Assignee: Tachi-S Co., Ltd., Tokyo, Japan

[21] Appl. No.: 399,809

[22] Filed: Aug. 29, 1989

[30] Foreign Application Priority Data

Jul. 11, 1988 [JP] Japan .................................. 63-091035

[51] Int. Cl.$^5$ ................................................ A47C 3/00
[52] U.S. Cl. ...................................... 297/284; 297/312
[58] Field of Search ................................ 297/284, 312

[56] References Cited

U.S. PATENT DOCUMENTS 4,019,777  4/1977  Hayashi ................................ 297/284

FOREIGN PATENT DOCUMENTS 3710466  10/1987  France ................................. 297/284
1011726  12/1965  United Kingdom ................. 297/284

Primary Examiner—Laurie K. Cranmer
Attorney, Agent, or Firm—Browdy and Neimark

[57] ABSTRACT

A lumbar support device for a vehicle seat, in which a lumbar support force is adjusted in a fine, stepless way at a desired degree. Springs are disposed between a slider and a arm having a lumbar support plate so as to give a force to the lumbar support plate. The slider is threadedly engaged with a drive shaft in a manner being movable thereon by operation of a handle fixed to the drive shaft.

2 Claims, 3 Drawing Sheets

LUMBAR SUPPORT DEVICE FOR VEHICLE SEAT

BACKGROUND OF THE INVENTION

1. Field of the Invention

The present invention relates to a lumbar support device which is used in a vehicle seat with a view to adjustably supporting the lumbar part of an occupant on the seat and helping to alleviate the fatigue taken by the occupant from his or her long period of sitting on the seat.

2. 2. Description of the Prior Art

During a long period of driving a vehicle, a fatigue develops from the unchanged seating posture of an occupant on the seat. As a means for alleviating the fatigue, there has been known a lumbar support device for adjustably supporting the lumbar part of the occupant in order for him or her to attain a most comfortable seating state anytime. Generally, most of hitherto lumbar support devices is based on a spring-force adjusting type thereof using a cam having plural discrete cam surfaces. According to this prior art, a lumbar support plate is moved forwardly and backwardly against the lumbar part of the seat under the biasing force of a spring, and the operation of handle fixed to the cam causes rotation of the cam to present a different cam surface level, which expands or contracts the spring to vary its biasing force and thus the lumbar support plate is adjustably moved forwardly and backwardly so as to provide different lumbar support forces to the lumbar part of the occupant on the seat. Thus, the occupant may adjust the lumbar support force as desired to attain a best seating posture.

However, that conventional lumbar support device has been with such drawback that the use of the cam results in only giving a step adjustment and does not offer a fine, stepless adjustment of lumbar support plate, which has not satisfied the delicate tastes of the occupant who wish to enjoy a fine adjustment to achieve a best lumbar support force.

SUMMARY OF THE INVENTION

It is therefore a primary purpose of the present invention to provide a lumbar support device for a vehicle seat which permits a fine, stepless adjustment of its lumbar support force.

In attaining such purpose, the present invention comprises a drive shaft with a handle, a slider which is in a threaded engagement with the drive shaft in manner being movable along the longitudinal direction of the drive shaft by operation of the handle, an arm having a lumbar support plate rockable on its forward end, and a pair of springs provided between the slider and arm, wherein the pair of springs are disposed on the opposite sides of and symmetrically relative to the drive shaft.

Accordingly, the operation of the handle causes the movements of the slider, which expands and contracts the springs to adjust a lumbar support force at the lumbar support plate through the arm. Due to threaded engagement between the drive shaft and slider, the adjustment is effected in a fine, stepless way for the lumbar support force.

In one aspect of the invention, the springs are adjusted in biasing force against the lumbar support plate through the movements of the slider effected by operation of the handle, and as such, the adjustment is made with a small force in comparison with the cam adjustment as in the prior art.

In another aspect of the invention, the principal construction thereof is based on the simple disposition of the springs between the arm and slider, which does not require a further elements. Thus, the structure is much simplified.

In still another aspect of the invention, the slider is stably moved on the drive shaft against inclination, because of the two springs being arranged on the opposite sides of and symmetrically relative to the drive shaft, and supports the slider in such way.

DETAILED DESCRIPTION OF PREFERRED EMBODIMENTS OF THE INVENTION

Figure 3:
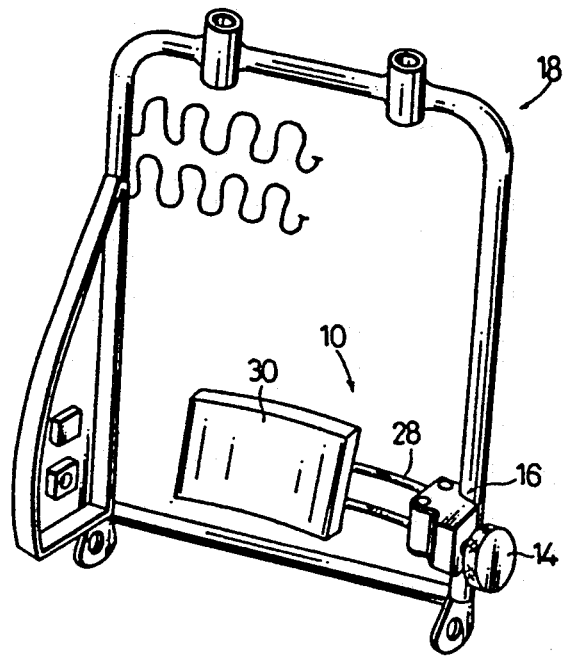
FIG. 3 is a schematic perspective view which shows the state wherein the lumbar support device is mounted on a seat back frame of the seat.
Figure 4:
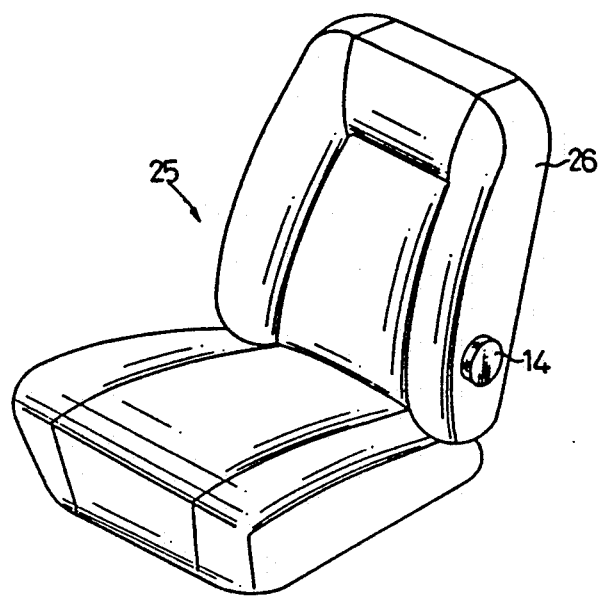
FIG. 4 is a perspective view of a vehicle seat in which the lumbar support device of the present invention is incorporated.

FIG. 3 shows a seat back frame (18) in which is mounted a lumbar support device (10) in accordance with the present invention, and FIG. 4 shows a seat (25) which incorporates the lumbar support device (10) therein.

Figure 1:
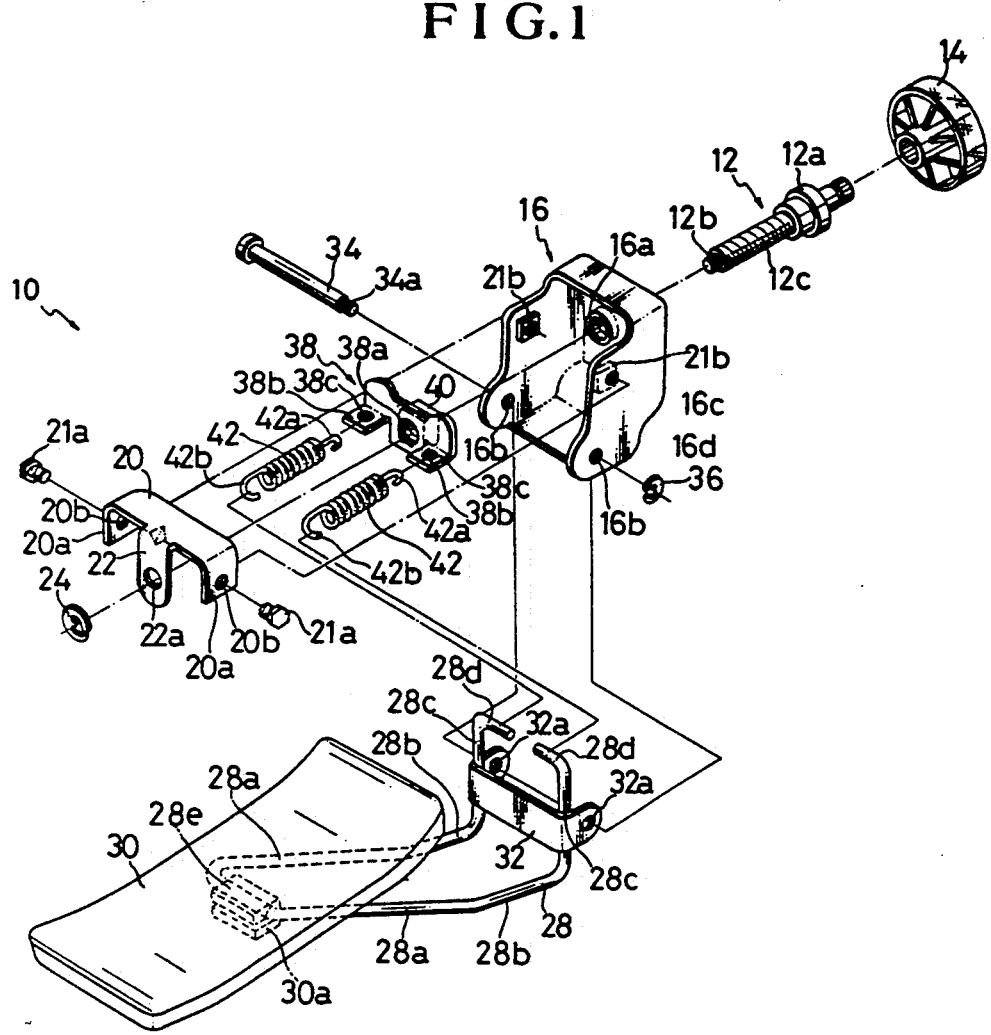
FIG. 1 is an exploded perspective view of a lumbar support device for vehicle seat in accordance with the present invention.

Reference is now made to FIGS. 1 and Z which illustrate a specific structure of the lumbar support device (10) as a first embodiment. Description will be made thereof hereinafter.

Designation (16) denotes a support bracket which is formed in a shape of a half-cut container wherein, as shown, the front part of the bracket (16) is opened, with its rear wall being formed with a hole (16a), and its both lateral side walls being formed with two upper holes (16c) respectively and being further formed with two lower holes (16d) respectively. The lower rear corner of the bracket (16) is formed with a semi-circular recessed portion (16d) which serves as a mounting part to be fixed on the lateral frame section of the seat back frame (18), as can be seen from FIG. 3. Two nuts (21b)(21b) are fixed at the inner walls respectively of both lateral walls of the bracket (16) in a coaxial relation with the two upper holes (16c).

A drive shaft (12) is shown as comprising a male threaded part (12c), a stepped large circular flange part (12a) whose two circumferences are greater in diameter than the male threaded part (12c), and a forward securing end (12b) whose diameter is smaller than that of the male threaded part (12c). The rearward end of the drive shaft (12) is fixed with a handle (14) in a spline connecting manner.

To the male threaded part (12c) of the drive shaft (12), is threadedly engaged the female threaded hole (38a) of a nut (40). The nut (40) is fixed on the rear side of a slider (38) in a coaxial relation with the hole (38a) of the slider (38).

The slider (38) has a pair of forwardly projected parts (38b)(38b) formed therewith, each of them having a spring securing hole (38c) perforated therein.

The drive shaft (12) is at its stepped large circular flange part (12a) inserted through the hole (16a) and retained there rotatably, so that the handle (14) projects outwardly of the bracket (16), while the male threaded part (12c) extends within the bracket (16) with the slider (38) engaged threadedly thereabout. The forward securing end (12b) of the drive shaft (12) is rotatably inserted through the securing hole (22a) of the support plate (20) and secured there by means of an E-ring (24).

The support plate (20) is shown as having a pair of downwardly bent side lugs (20a)(20a), each being formed with a hole (20b), and a vertical support leg (22) in which is formed the foregoing securing hole (22a). The support plate (20) is fixed at the top portion of the bracket (16) such that the two downwardly bent side lugs (20a)(20a) of the support plate (20) are superposed on the lateral walls of the bracket (16) where the holes (16c) exist, respectively, and two securing screws (21a)(21a) are inserted through the holes (20b)(16c) from both sides, respectively, and threadedely secured in the respective nuts (21b)(21b). Hence, the drive shaft (12) is supported at the hole (16a) of the bracket (16) as well as at the hole (22a) associated with the support plate (20) in such a manner as to be rotatable about its axis and prevented against movement in its longitudinal direction.

Designation (28) denotes an arm which is basically formed by bending a steel rod into a generally " " shaped configuration, and thereafter, bending further the rod partially such as to define a pair of sloped forward rod sections (28a)(28a), a pair of intermediate rod sections (28b), a pair of upstanding rod sections (28c), a pair of opposingly faced bent end sections (28d)(28d), and a forward end section (28e).

A lumbar support plate (30) is secured at its securing member (30a) on the forward end section (28e) of the arm (28) in a manner being rockable thereupon.

A support bracket (32) is fixed on the two upstanding rod sections (28c)(28c) of the arm (28), extending therebetween. The support bracket (32) has a pair of holes (32a)(32a) formed at its ends.

Those two holes (32a)(32a) of the support bracket (32) are aligned coaxially with the two lower holes (16b)(16n), respectively, and through all those holes (16b)(32), passes a support pin (34) whose securIn8 end (34a) is secured at one lateral side of the bracket (16) by means of an E-ring (36), so that the arm (28) is rotatable about the support pin (34).

A pair of tension springs (42) are extended between the two end sections (28d)(28d) of the arm (28) and two forwardly projected parts (38b)(38b) of the slider (38), such that the forward hook parts (42b)(42b) of the springs (42) are securely attached about the two forwardly projected parts (38b)(38b) while the rearward hook parts (42a)(42a) thereof are likewise attached into the two holes (38c)(38c) of the forwardly projected parts (38b).

By rotating the handle (14), therefore, the slider (38) is caused to move along the threaded part (12c) of the drive shaft (12) in its longitudinal direction, to thereby increase or decrease the tension force of the springs (42)(42).

The above-constructed lumbar support device is at its semi-circular recessed portion (16d) welded on one lateral frame section of the seat back frame (18) as shown in FIG. 3. The lumbar support plate (30) is disposed at the lumbar part in the seat back (26) such as to be displaced forwardly and backwardly of the seat back frame (18).

Figure 2:
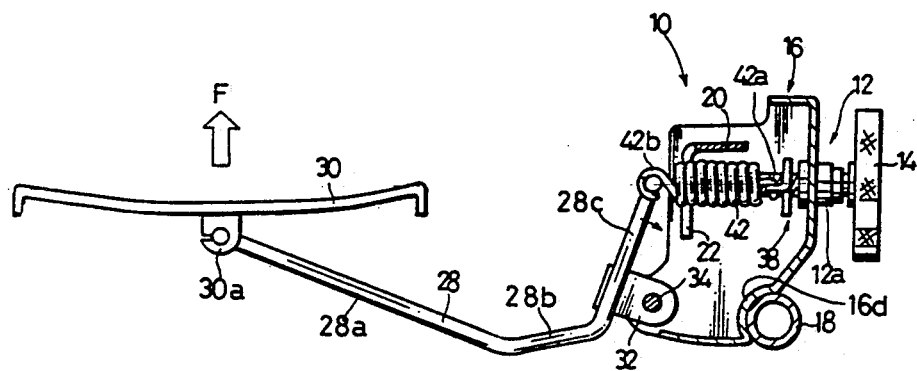
FIG. 2 is a generally longitudinal sectional view of the lumbar support device.

With the above-stated structure referring to FIG. 2, the arm (28) is normally so biased by the contracting force of the tension springs (42)(42) as to tend to rotate clockwise about the support pin (34), whereby the lumbar support plate (30) is biased in a direction forwardly of the seat back (26), producing a lumbar support force (F) against a counter lumbar-part load of an occupant on the seat (25).

In operation, when the handle (14) is rotated to cause the slider (38) to move rearwardly (namely, in the right-hand-side direction, as viewed in FIG. 2) along the longitudinal axial direction of the drive shaft (12), the tension springs (42)(42) are expanded longer between the end sections (28d) (28d) of the arm (28) and slider (38), producing a greater drawing force in the springs (42)(42), which causes rotation of the arm (28) in the arrow direction about the support pin (34), giving a greater lumbar support force (F) at the lumbar support plate (30). Reversely, when the handle (14) is rotated to cause the backward movement of the slider (42) (namely, in the left-hand-side direction, as viewed in FIG. 2) along the longitudinal axial direction of the drive shaft (12), the springs (42)(42) are contracted shorter between the end sections (23d), producing a decreased drawing force in the springs (42)(42), so that a less lumbar support force is given at the lumbar support plate (30). In that way, a stepless, fine adjustment is made prior the lumbar support force at a desired degree against the lumbar part of the seat (25).

Figure 5:
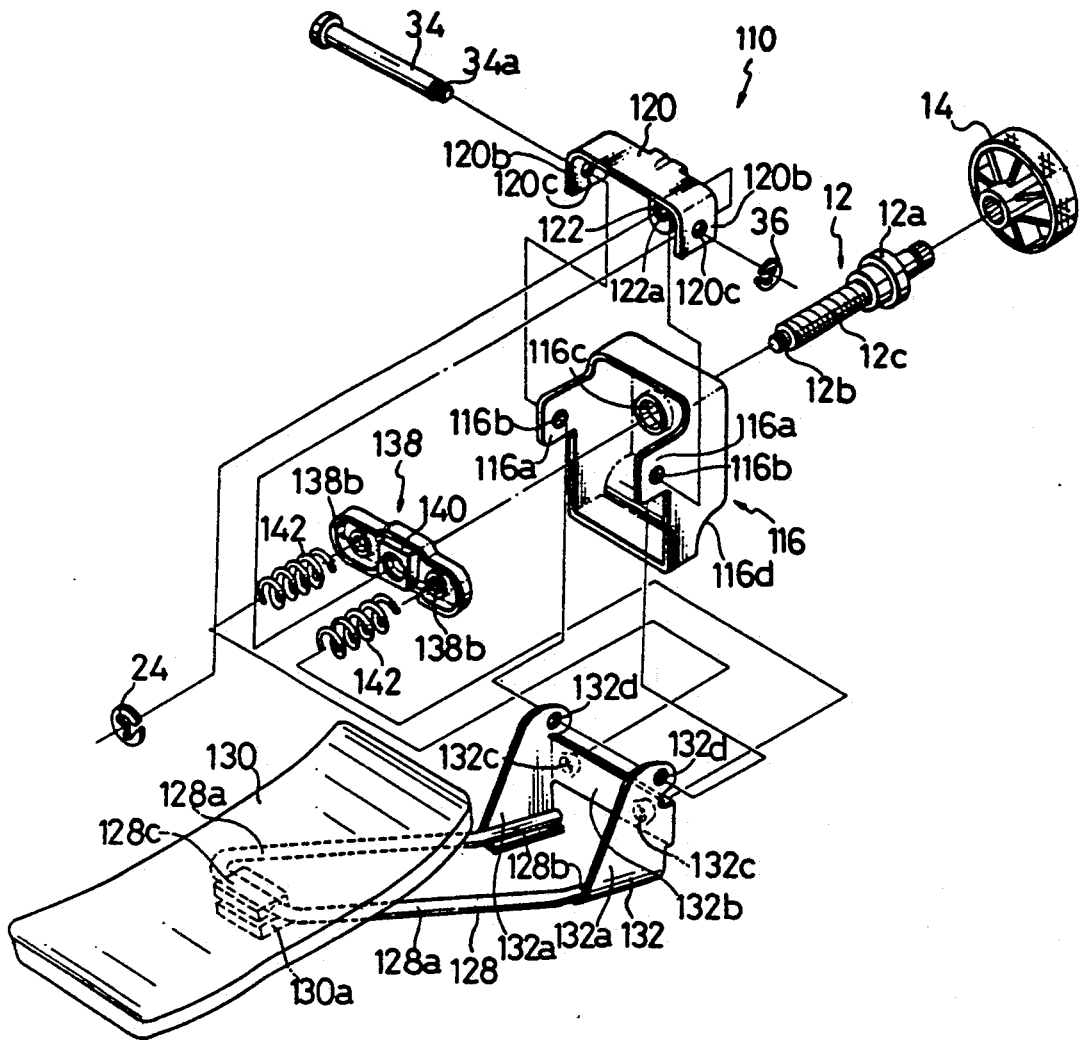
FIG. 5 is an exploded perspective view of another embodiment of the lumbar support device in accordance with the present invention.
Figure 6:
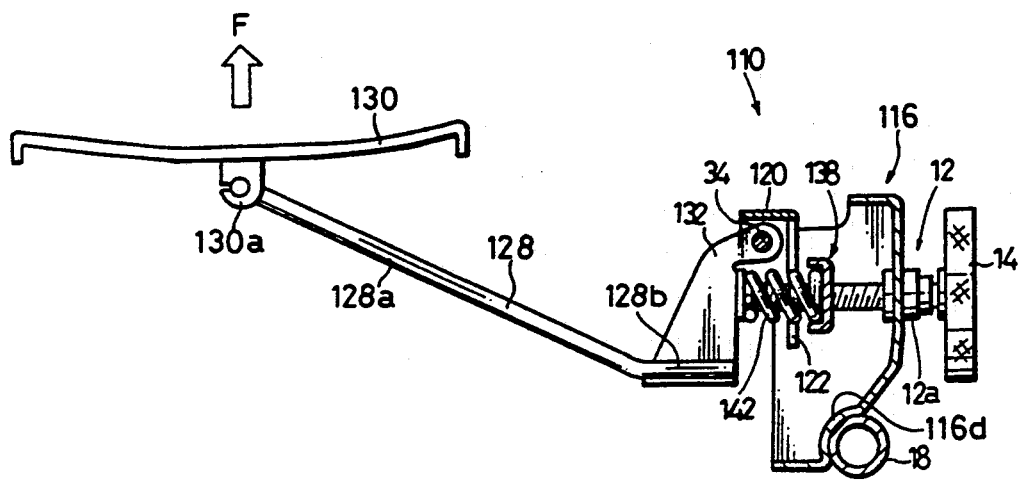
FIG. 6 is a generally longitudinal sectional view of such another embodiment.

FIGS. 5 and 6 show another embodiment of the present invention, generally designated at (110), in which a pair of compression springs (142)(142) are utilized in place of the foregoing tension springs (42)(42).

It should be understood that the drive shaft (12) with the handle (14), support pin (34) and E-rings (24)(36) in the above first embodiment are employed in the present embodiment.

In contrast to the above-described first embodiment wherein the rotation center of the arm (28), at the support pin (34), is located below the springs (42), in view of the drawing force of the tension springs (42), the construction of the present second embodiment is such that an arm support bracket (132) is provided, whose spring abutment part (132b) is normally pressed forwardly by the two compression springs (142)(142), and the upper portion of the arm support bracket (132) is formed with a pair of holes (132d)(132d) through which the support pin (34) passes, while the lower portion of the same bracket (132) is formed with a pair of spaced-apart support legs (132a)(132a) to which an arm (28) is fixed. Thus, according to this embodiment, considering the nature of the compression springs (142)(142), the rotation center of the arm (128) is defined at the support pin (34), which means to be located above the springs (142)(142), so that the arm support bracket (32) is rotated in the right-hand and left-hand directions, as viewed from FIG. 6, by the pushing force of the compression springs (142)(142) with respect to the support pin (34), to thereby cause the lumbar support plate (130) to move forwardly and backwardly with respect to the seat back frame (18).

Specifically, a support bracket (116) is formed with a pair of forwardly projected lugs (116a)(116a), each having a hole (116b) perforated therein, and a hole (116c) formed in the rear wall of the bracket (116), the bracket (116) being formed in a halfcut container shape, like that (16) of the first embodiment. A support plate (120) has a pair of downwardly bent side lugs (120b)(120b), each being formed with a hole (120c), and a vertical support leg (122) in which a hole (122a) is formed. A slider (138) is at its central part provided with a nut (140) fixedly, which nut (140) has a female threaded hole as shown, and is further formed with a pair of spring seats (138b)(138b) on the opposite sides of the nut (140). The arm (128) is formed by bending a rod into a generally " "-shaped configuration, and further bending partially the same to define a pair sloped sections (128a)(128a), a pair of horizontal securing sections (128b)(128b) and a forward end section (128c). The lumbar support plate (130) has a securing member (130a) in which is rotatably secured the forward end section (128c) of the arm (128).

The drive shaft (12) is at its stepped flange portion (12a) supported in the hole (116c) of the support bracket (116) in a rotatable manner. The male threaded part (116) of the drive shaft (12) is threadedly engaged with the female threaded hole of the nut (140) of the slider (138).

The support plate (120) is disposed upon the top part of the support bracket (116) with both side lugs (120b)(120b) of the support plate (120) being juxtaposed on the respective outer surfaces of the forwardly projected lugs (116a)(116a) so that the holes (120b)(116b) respectively of the support plate (120)(116) are coaxially aligned with one another. On the other hand, the two upper end portions of the arm support bracket (132), where the two holes (132d)(132d) are respectively perforated, are juxtaposed on the respective inner surfaces of the forwardly projected lugs (116a)(116a) of the support plate (116), so that the holes (132d)(132d) are coaxially aligned with the respective holes (120c)(120c) of the support plate (116).

The support pin (34) passes through all those coaxially aligned holes (120c)(116b)(132d) and its securing end (34) is secured by the E-ring (36)

The two compression springs (142)(142) are interposed between the spring seats (138b) of the slider (104) and those (132c) of the arm support bracket (132), respectively, in a secured manner.

As shown, the vertical support leg (122) of the support plate (120) is dependent in front of the slider (138) and further interposed between the two compression springs (142)(142), with the securing end (12b) of the drive shaft (12) being inserted through the hole (122a) of that leg (122) and secured by the E-ring (24).

In operation, the rotation of the handle (14) causes the movements of the slider (138) along the threaded portion (12c) of the drive shaft (12) in its longitudinal direction, which increases or decreases the pushing force of the compression springs (142)(142). As viewed from FIG. 6, when the handle (14) Is rotated to cause the slider (138) to move in the left-side direction, the compression springs (142)(142) are compressed, imparting an increased pushing force to the arm support bracket (132), which is produced at the lumbar support plate (130) as a lambar support force (F). Reversely, when the handle (14) is rotated to cause the slider (138) to move in the right-side direction, the springs (142)(142) are loosened their pushing force, thereby decreasing the lumbar support force (F). In that way, a stepless, fine adjustment can be made to set a desired degree of lumbar support force.

Accordingly, from the descriptions above, the present invention is endowed with the following advantageous effects:

(1) The handle (14) is rotated well with a small force, as opposed to the prior art in which a cam is caused to rotate by operation of the handle. In particular, the number of its rotation is small, which is sufficient to produce a great lumbar support force through the spring and slider.

(2) The major constituent parts are basically the springs, slider, arm, and drive shaft, which are quite simplified structurally.

(3) The slider (38 or 138) are maintained against inclination by virtue of the two springs (42 or 142) being secured thereto in a symmetrical manner relative to the drive shaft (12).

While having described as above, the present invention is not limited to the illustrated embodiments, but any other modifications, replacements, and additions may structurally be possible without departing from the scopes and spirits of the apPended claims. For instance, instead of the nut (40) being provided at the slider (40), an integral female threaded hole is formed directly in the slider (40).

What is claimed is:

1. A lumbar support device for a vehicle seat, comprising:

a support arm including a lumbar support plate which is rockable upon and end of said support arm;

a drive shaft which is free to be rotated by a handle fixed thereto; and a spring means for biasing said support arm in a given direction, said spring means being disposed between said support arm and drive shaft such that said spring means is operatively connected with both said support arm and drive shaft, whereby operation of said handle causes rotation of said drive shaft which in turns causes expansion and contraction of said spring means so as to adjust a biasing force of said support arm, thus adjusting a lumbar support force at said lumbar support plate; wherein said drive shaft is formed with a male threaded portion, wherein there is provided a slider means which has a female threaded hole in which is threadedly engaged said male threaded portion of said drive shaft, such that said slider means is movable in a longitudinal direction of said drive shaft, and, wherein said spring means comprises a pair of tension springs which are disposed on opposite sides of and in symmetrical relation to said drive shaft; said spring means being provided between said slider means and support arm;

wherein a container-like bracket is fixed to a lower portion of a seat back frame of said seat, and wherein said support arm is rotatably connected to a lower part of said bracket by means of a support pin, wherein a support bracket having a hole formed therein, in which one end of said drive shaft is rotatably secured, is fixed in an upper part of said bracket, and wherein said bracket has a hole through which the other end portion of said drive shaft is rotatably supported, in such a manner that said drive shaft is free to be rotated and prevented against movement in a longitudinal direction thereof.

2. The lumbar support device according to claim 1, wherein said slider means is provided on said drive shaft such as to be movable along a longitudinal direction of said drive shaft and further disposed between said bracket and support plate.

* * * * *